United States Patent [19]

Iijima

[11] Patent Number: 4,939,353
[45] Date of Patent: Jul. 3, 1990

[54] PROCESSING SYSTEM FOR ENABLING DATA COMMUNICATION WITH A SELF-DIAGNOSE DEVICE

[75] Inventor: Yasuo Iijima, Yokohama, Japan

[73] Assignee: Kabushiki Kaisha Toshiba, Kawasaki, Japan

[21] Appl. No.: 143,654

[22] Filed: Jan. 13, 1988

[30] Foreign Application Priority Data

| Jan. 22, 1987 | [JP] | Japan | 62-12709 |
| Mar. 23, 1987 | [JP] | Japan | 62-68239 |
| Mar. 23, 1987 | [JP] | Japan | 62-68241 |
| Mar. 27, 1987 | [JP] | Japan | 62-71624 |

[51] Int. Cl.$^5$ .............. G06F 15/30; G06F 11/00; G06K 19/06
[52] U.S. Cl. .............. 235/438; 235/492; 235/441; 235/380; 364/267; 364/284; 364/222.2; 364/946; 364/946.1
[58] Field of Search ... 364/200 MS File, 900 MS File; 235/492, 441, 438, 380; 340/825.16

[56] References Cited

U.S. PATENT DOCUMENTS

| 4,051,326 | 9/1977 | Badagnani et al. | 364/900 |
| 4,575,621 | 3/1986 | Dreifus | 235/380 |
| 4,767,920 | 8/1988 | Kitta et al. | 235/492 |
| 4,777,355 | 10/1988 | Takahira | 235/380 |
| 4,785,166 | 11/1988 | Kushima | 235/492 |
| 4,807,186 | 2/1989 | Ohnishi et al. | 364/900 |
| 4,816,656 | 3/1989 | Nakano et al. | 235/380 |
| 4,825,054 | 4/1989 | Rust et al. | 235/380 |
| 4,829,166 | 5/1989 | Froelich | 235/492 |
| 4,839,792 | 6/1989 | Iijima | 364/200 |
| 4,841,131 | 6/1989 | Iijima | 235/380 |
| 4,841,134 | 6/1989 | Hida et al. | 235/488 |
| 4,868,372 | 9/1989 | Oomira et al. | 235/380 |

FOREIGN PATENT DOCUMENTS

| 0173103 | 3/1986 | European Pat. Off. |
| 0196028 | 10/1986 | European Pat. Off. |
| 0209092 | 1/1987 | European Pat. Off. |
| 3535577 | 4/1986 | Fed. Rep. of Germany |

OTHER PUBLICATIONS

IBM Technical Disclosure Bulletin, vol. 28, No. 8, Jan. 1986 (1 Sheet).
Elektronik, Datentechnik, Vogt, Roland, IC-Cards-neue Aspekte der Informationsverarbeitung, 1986, pp. 99-101.

Primary Examiner—Gareth D. Shaw
Assistant Examiner—Gopal C. Ray
Attorney, Agent, or Firm—Cushman, Darby & Cushman

[57] ABSTRACT

In a processing system for enabling data communication between a card reader/writer and an IC card, the card reader/writer transmits a reset signal to the IC card. When IC card receives the reset signal, a control element initiates operations to execute a self diagnosis program stored in a program memory. When the control element determines according to the self diagnosis that the IC card can be operated normally, the control element reads out initial response data from the program memory and sends it to the card reader/writer. Upon reception of the initial response data, the card reader/writer begins a predetermined operation. If the control element determines that the IC card cannot be operated normally, it inhibits transmission of the initial response data to the card reader/writer and sets the IC card in a halt state.

21 Claims, 9 Drawing Sheets

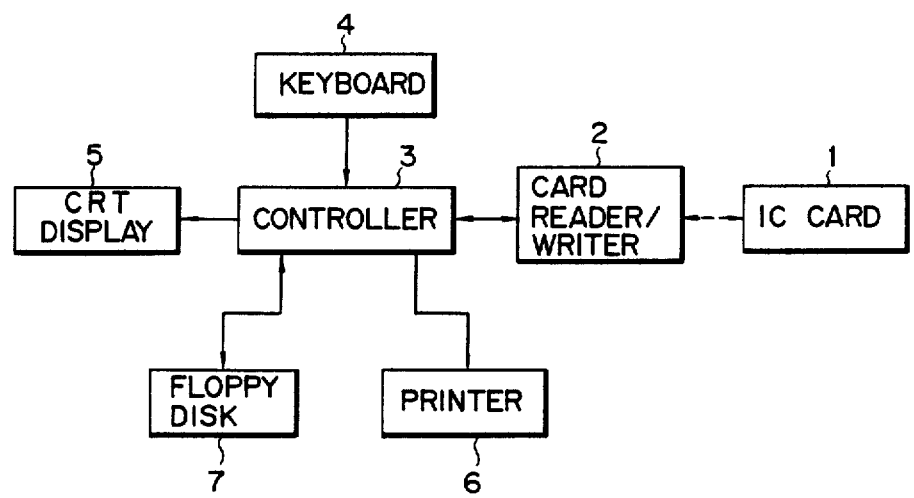
F I G. 1
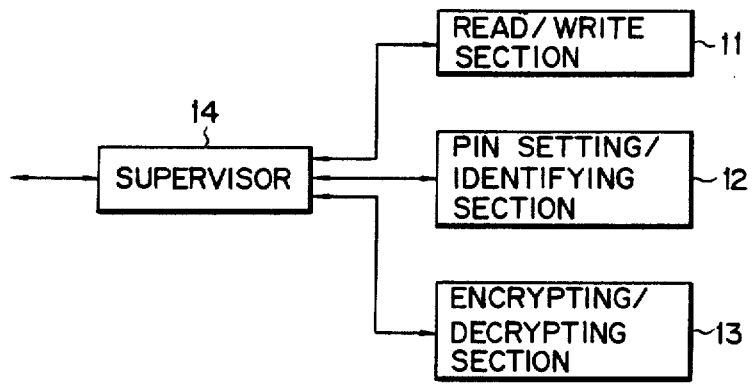
F I G. 2

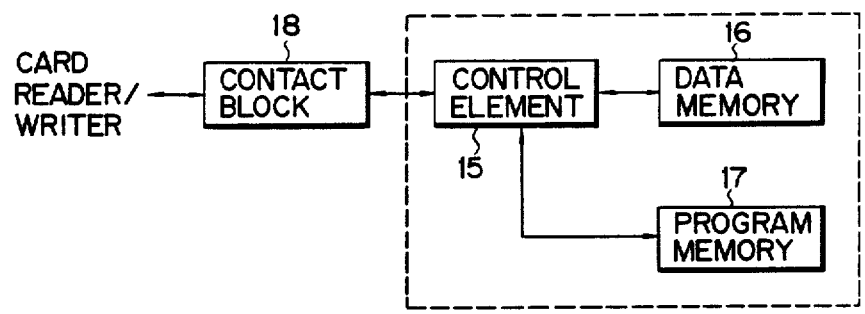
F I G. 3
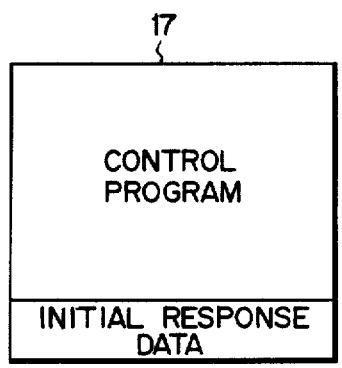
F I G. 4
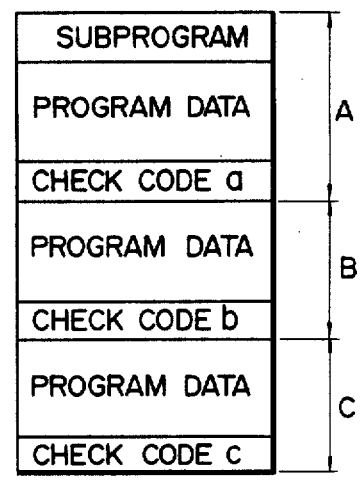
F I G. 5

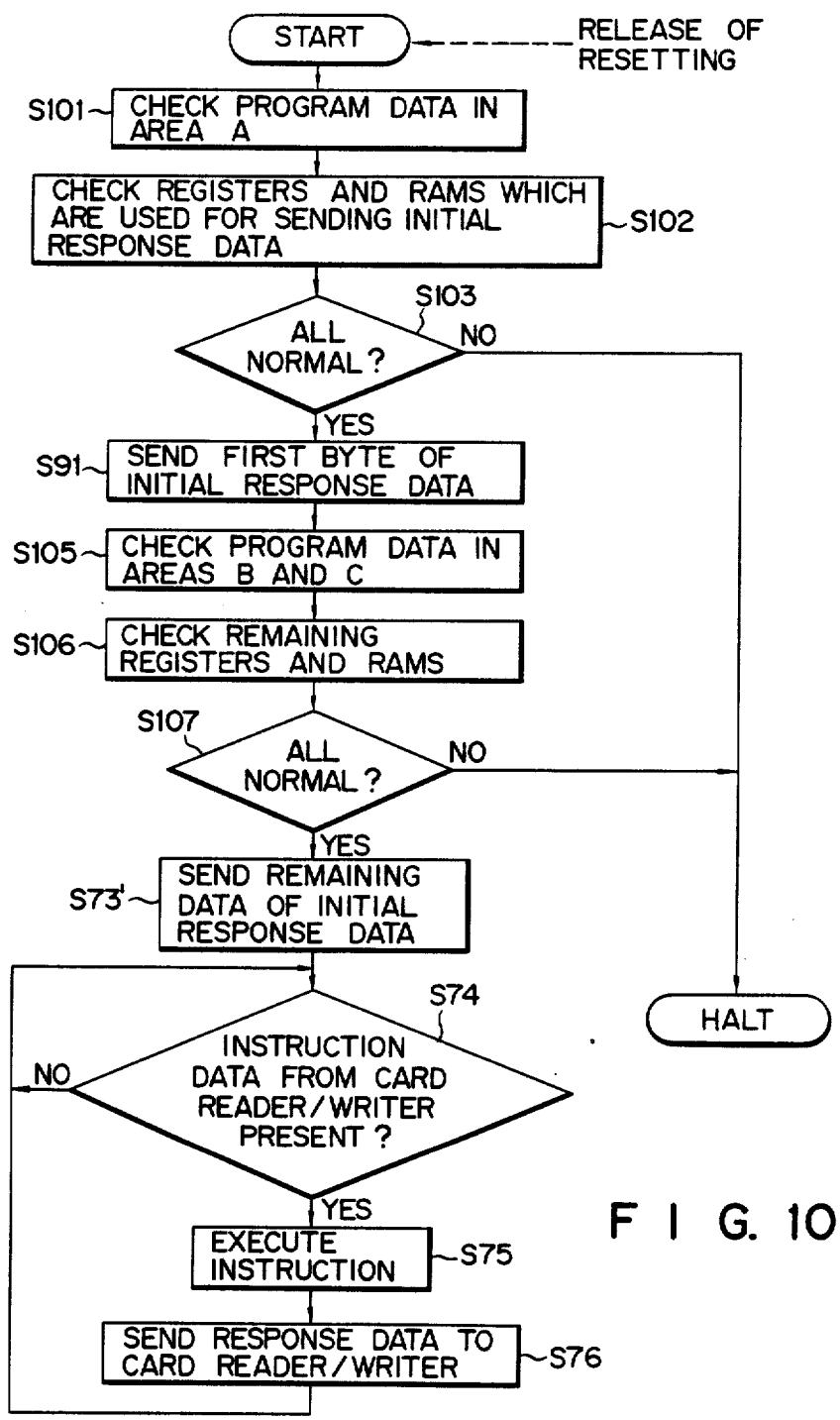
F I G. 10

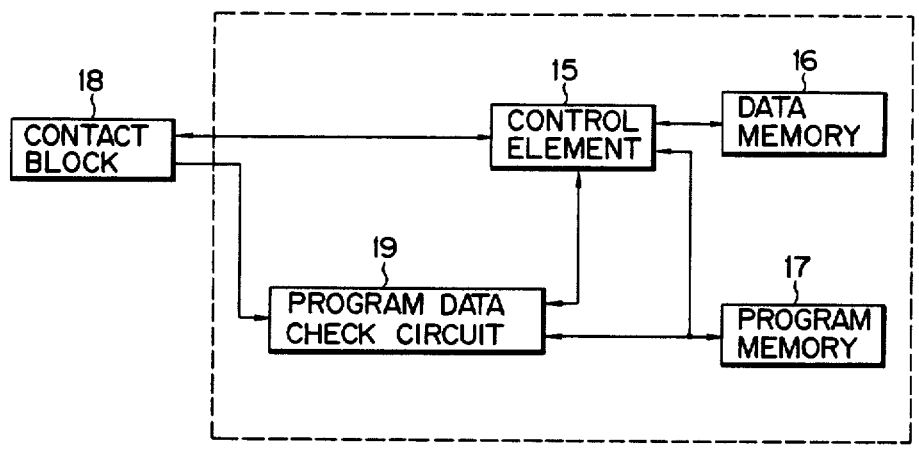
F I G. 11

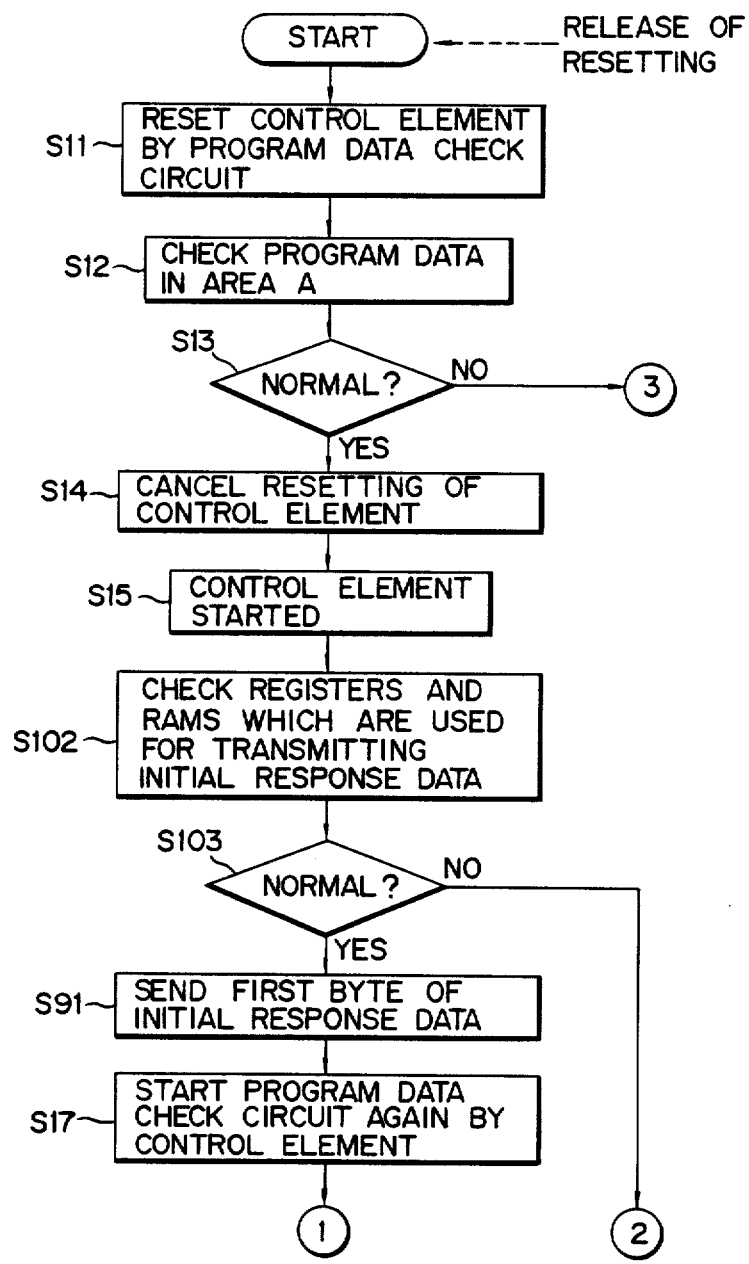
F I G. 12A

PROCESSING SYSTEM FOR ENABLING DATA COMMUNICATION WITH A SELF-DIAGNOSE DEVICE

BACKGROUND OF THE INVENTION

The present invention relates to a processing system for causing first electronic device such as a as an IC card to perform data communication according to half-duplex transmission in such a manner that the second electronic device is started in response to a control signal from the first electronic device and initial response data representing the start of operation is sent from the second electronic device to the first electronic device.

A conventional processing system is available which can cause first and second electronic devices to perform data communication according to "half-duplex transmission". The term "half-duplex transmission" means that the first and second electronic devices perform bidirectional data communication, but inhibit data communication from one device to the other device when the other device performs data communication to the one device. In such a processing system, the operation of the second electronic device is started upon release of resetting in response to a reset signal from the first electronic device and then instruction data from the first electronic device is received and decoded by the second electronic device. After the processing corresponding to the instruction data is completed, the second electronic device sends a processing result as response data to the first electronic device. This processing system can be normally operated when transmission protocols are known to the first and second electronic devices.

In recent years, such a processing system is applied as a system using an IC card. Transmission protocols vary according to the types of IC card (the second electronic device). In order to signal a transmission protocol and the like to a card reader/writer (the first electronic device), the IC card detects release of resetting of the card reader/writer by a reset signal and sends initial response data called answer-to-reset data. The IC card then waits for instruction data from the card reader/writer. The card reader/writer starts operation upon reception of the initial response data from the IC card.

In this case, when the IC card is not normally operated, e.g., when operation after release of resetting is not normally operated due to the failure of a RAM or register in a control element, release of resetting causes transmission of the initial response data. However, since the IC card is held in an abnormal state, system reliability is degraded.

SUMMARY OF THE INVENTION

It is an object of the present invention to solve the conventional problem, i.e., system reliability degradation wherein a second electronic device sends initial response data to a first electronic device upon initialization of the second electronic device even if the second electronic device cannot be normally operated, so that the operation of the first electronic device is undesirably started in response to the initial response data, and therefore to provide a processing system capable of inhibiting sending of the initial response data and improve reliability of the system when the second electronic device cannot be normally operated.

According to the present invention, there is provided a processing system for enabling data communication between first and second electronic devices, comprising a first electronic device for sending a control signal to a second electronic device so as to start the second electronic device, receiving initial response data representing the start of the second electronic device from the second electronic device, sending predetermined instruction data to the second electronic device upon reception of the initial response data, and receiving a processing result in response to the instruction data from the second electronic device, and the second electronic device including self-diagnosing means for self-diagnosing, prior to transmission of the initial response data to the first electronic device, whether a normal operation is performed when the control signal is received from the first electronic device, initial response data transmitting means for transmitting the initial response data to the first electronic device when the self diagnosis result of the self-diagnosing means indicates that the normal operation can be performed, and inhibiting means for inhibiting the transmission of the initial response data and setting the second electronic device in a halt state when a self diagnosis result of the self-diagnosing means indicates that the normal operation cannot be performed, and processing means for receiving the instruction data from the first electronic device, performing processing of the instruction data, and sending the processing result to the first electronic device.

BRIEF DESCRIPTION OF THE DRAWINGS

FIG. 1 is a block diagram of a card handling apparatus which employs a processing system of the present invention;

FIG. 2 is a functional block diagram of an IC card as a second electronic device in the processing system of the present invention;

FIG. 3 is a block diagram of an IC chip incorporated in the IC card;

FIG. 4 is a memory map showing a format of a program memory in the IC card;

FIG. 5 is a chart for explaining a program data structure;

FIG. 10 is a flow chart for explaining a fourth embodiment of the operation of the IC card as the second electronic device in the processing system of the present invention;

FIG. 11 is a block diagram of an IC chip incorporated in an IC card according to another embodiment of the present invention; and FIGS. 12A and 12B are flow charts for explaining the operation of the IC card of FIG. 11.

DETAILED DESCRIPTION OF THE PREFERRED EMBODIMENTS

Figure 6:
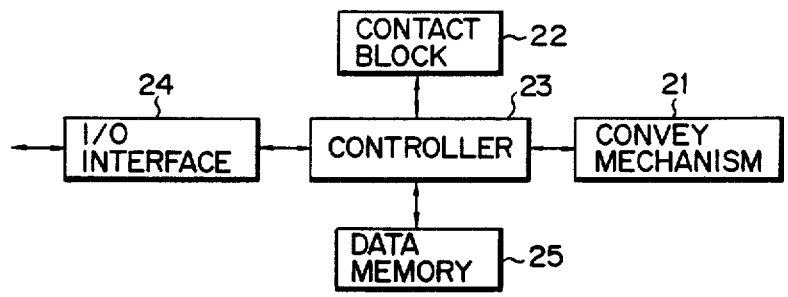
FIG. 6 is a block diagram showing an arrangement of a card reader/writer as a first electronic device in a processing system of the present invention.

A card processing apparatus which employs a processing system of the present invention will now be described below.

This card processing apparatus is used as a terminal such as a home banking system or home shopping system, in conjunction with an IC card. FIG. 1 shows an arrangement of the card processing apparatus. IC card 1 (i.e., a second electronic device) is connected to controller 3 of a CPU and the like via card reader/writer 2 (i.e., a first electronic device) as the card handling apparatus. Connected to controller 3 are keyboard 4, CRT display 5, printer 6, and floppy disk 7.

IC card 1 is used to identify a personal identification number (PIN) known only to its user and to store necessary data each time the user makes a purchase. FIG. 2 is a functional block diagram of IC card 1. Referring to FIG. 2, IC card 1 includes basic functional blocks such as read/write section 11, PIN setting/identifying section 12, and encrypting/decrypting section 13. IC card 1 also includes supervisor 14 for controlling the above basic functional blocks.

Read/write section 11 reads, writes, or erases data in cooperation with data memory 16 as is shown in FIG. 3. PIN setting/identifying section 12 stores a PIN set by the user and inhibits read access thereof, and at the same time identifies the PIN after it has been set, so as to permit subsequent operations to be performed. Encrypting/decrypting section 13 encrypts communication data and decrypts the encrypted data, to prevent leakage and counterfeiting when data is sent from controller 3 to another terminal via a communication line. Encrypting/decrypting section 13 performs data processing according to an encryption algorithm such as a DES (Data Encryption Standard) having sufficiently high encryption reliability. Supervisor 14 decodes a functional code or a functional code with data input at card reader/writer 2 and selects the required one of the basic functions, so as to execute the selected function.

In order for it to be able to perform the above functions, IC card 1 comprises control element (e.g., a CPU) 15, programmable nonvolatile data memory 16, program memory 17, and contact block 18 to be electrically connected to card reader/writer 2, as shown in FIG. 3. The elements in the dotted rectangle (i.e., control element 15, data memory 16, and program memory 17) are constituted by a single IC chip. Data memory 16 is used for a variety of data storage applications and is constituted by, for example, an EEPROM.

Program memory 17 is constituted by, for example, a mask ROM. The mask ROM stores control programs (for control element 15) including subroutines for realizing the basic functions and initial response data (including transmission protocol information for IC card 1 and comprising two or more bytes), as shown in FIG. 4. The control programs stored in program memory 17 have a data structure, as is shown in FIG. 5. The control program includes a plurality of check codes and a subprogram for checking the validity of program data on the basis of the check code. When the subprogram is executed, program data is read out and its validity is checked within the read range according to the check code. More specifically, check code a is used for checking program data within range A; b, within B; and c, within C. The check code is a check sum data of the program data within the corresponding range. Program data within range A includes at least an initial response data send program and a self diagnosis program.

Card reader/writer 2 performs exchange of functional codes and data between IC card 1 and controller 3. More specifically, as shown in FIG. 6, card reader/writer 2 comprises convey mechanism 21, contact block 22, controller 23, I/O interface 24, and data memory 25. Convey mechanism 21 conveys IC card 1 inserted in a card slot (not shown) to predetermined position. Contact block 22 is electrically connected to contact block 18 of IC card 1 set in the predetermined position. Controller 23 includes a CPU for controlling the overall operations. I/O interface 24 interfaces instruction data and response data between controllers 23 and 3. Data memory 25 stores data.

Figure 7:
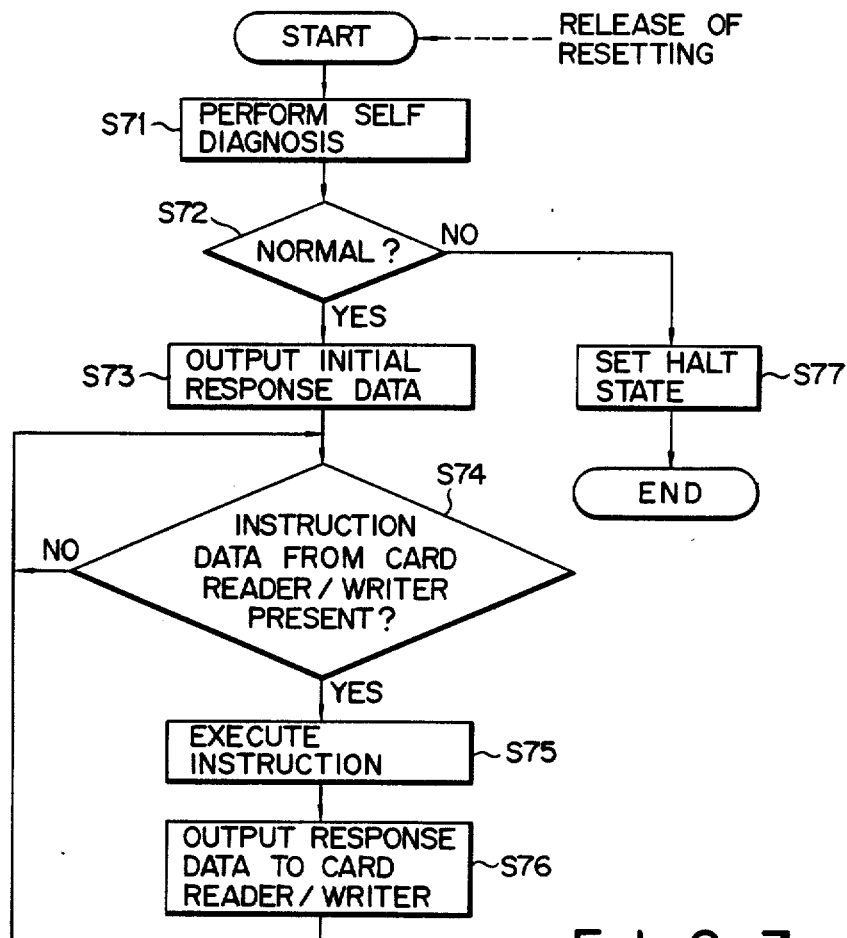
FIG. 7 is a flow chart for explaining a first embodiment of the operation of the IC card as the second electronic device in the processing system of the present invention.

The operation of the arrangement described above will be described with reference to a flow chart of FIG. 7. After IC card 1 is powered by and receives clocks from card reader/writer 2, IC card 1 receives a reset signal serving as a start control signal. Resetting of IC card 1 is released, and the operation of control element 15 is started. On the basis of the self diagnosis program stored in program memory 17, control element 15 self-diagnoses whether the subsequent operations can be normally performed (step S71). The self diagnosis program includes an operation for checking whether RAMs and registers in control element 15 are normally operated. If the self diagnosis result represents that the operation can be normally performed (step S72), control element 15 sends the initial response data to card reader/writer 2 (step S73). The initial response data is stored in program memory 17 and represents the start of operation. The initial response data includes the transmission protocol information for IC card 1.

After the initial response data is output, control element 15 waits for instruction data to be sent from card reader/writer 2 (step S74). When instruction data is input from card reader/writer 2 to control element 15, control element 15 executes the basic function represented by the instruction data (step S75). The response data representing the processing result is output to card reader/writer 2 (step S76), and control element 15 waits for the next instruction data (step S74).

However, if NO in step S72, control element 15 inhibits sending of the initial response data and is set in a halt state (step S77).

The IC card as the second electronic device self-diagnoses whether the normal operation can be performed upon its initialization but prior to transmission of the initial response data. When the IC card determines that the normal operation can be performed, the initial response data is sent to card reader/writer 2 as the first electronic device. Otherwise, the initial response data is not sent to the card reader/writer and control element 15 is held in the halt state. In other words, the IC card performs the self diagnosis upon initialization but prior to transmission of the initial response data and controls transmission of the initial response data. Therefore, the conventional drawback, i.e., transmission of the initial data regardless of the abnormal state of the IC card and starting of the card reader/writer in response to the initial response data, can be prevented and system reliability can be greatly improved.

The self diagnosis in step S71 is limited to the check of operations of the RAMs and registers in control element 15. A validity check of the program data in addition to such a self diagnosis, can further improve system reliability.

Figure 8:
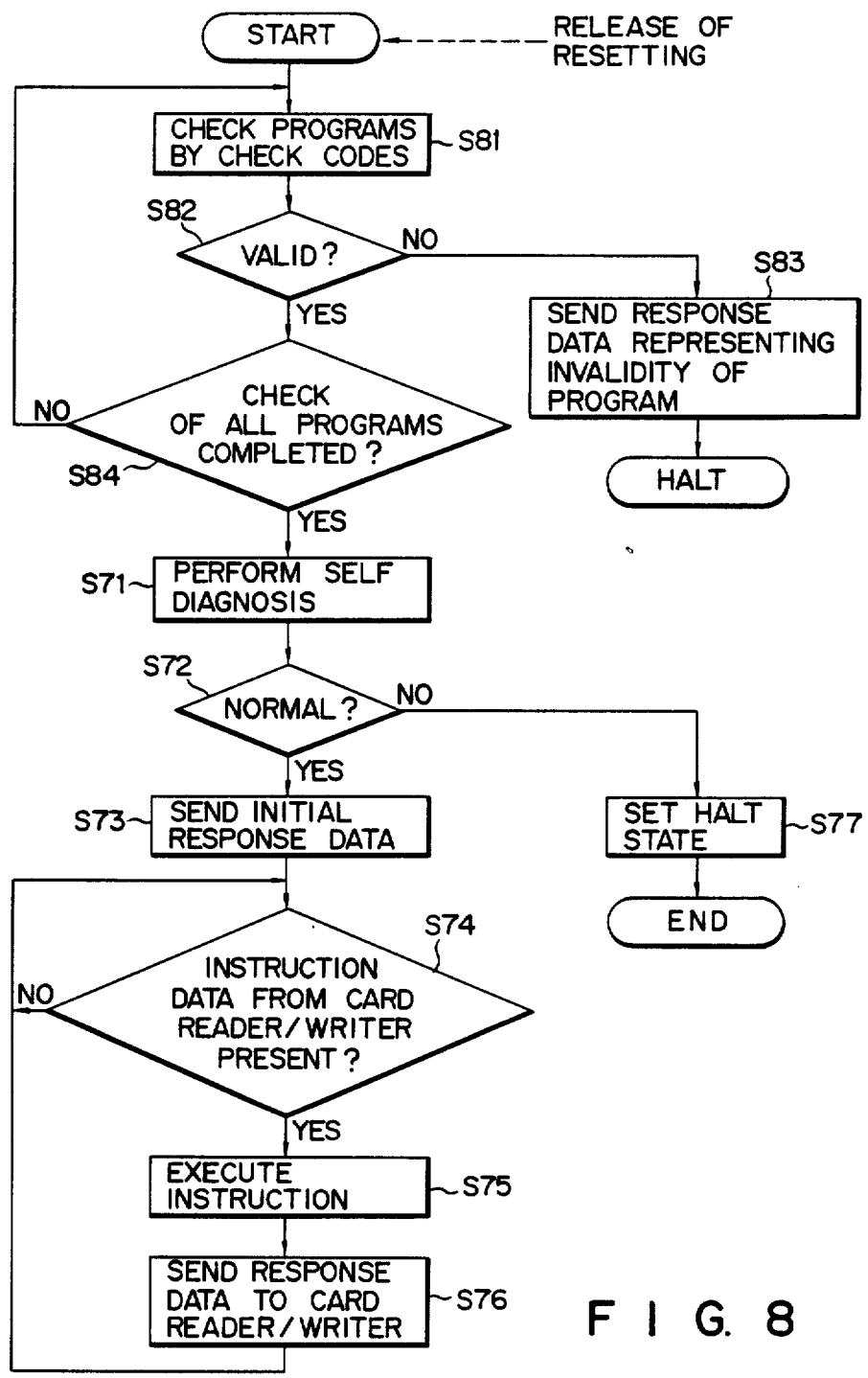
FIG. 8 is a flow chart for explaining a second embodiment of the operation of the IC card as the second electronic device in the processing system of the present invention.

The validity check of the program data is performed as shown in a flow chart of FIG. 8. More specifically, when control element 15 in IC card 1 is started, control element 15 executes a subprogram in a control program, thereby checking validity of the control program (step S81). The program data within range A are read out and sequentially added, and control element 15 determines whether the sum coincides with a value represented by check code a. This check operation continues until the end of the control programs, i.e., up to range C in FIG. 5. If control element 15 determines during checking that validity is not established (step S82), control element 15 immediately sends response data representing invalidity of the program to card reader/writer 2 (step S83) and is held in the halt state.

When all programs are checked to be valid (step S84), control element 15 executes the self diagnosis program (program data) in the control program. As described above, the operations in steps S71 to S77 are performed.

As is apparent from the above description, the validity of the control programs stored in program memory 17 is checked upon initialization of the IC card. If invalidity of the control program is detected, the IC card sends the response data representing invalidity of the program to the card reader/writer and is held in the halt state. Otherwise, the IC card performs the self diagnosis for checking whether the normal operation can be performed. Since validity of the control programs can be checked, failures caused by control program errors, i.e., errors of data constituting the interface program portion of the program data, do not lead to a further failure disabling data exchange with an external device even if the self diagnosis result represents an operative state of the IC card. In other words, when IC card 1 is held in an abnormal state or the control program errors are present, the initial response data is not sent to card reader/writer 2. Card reader/writer 2 is kept inoperative, and system reliability can be improved.

Figure 9:
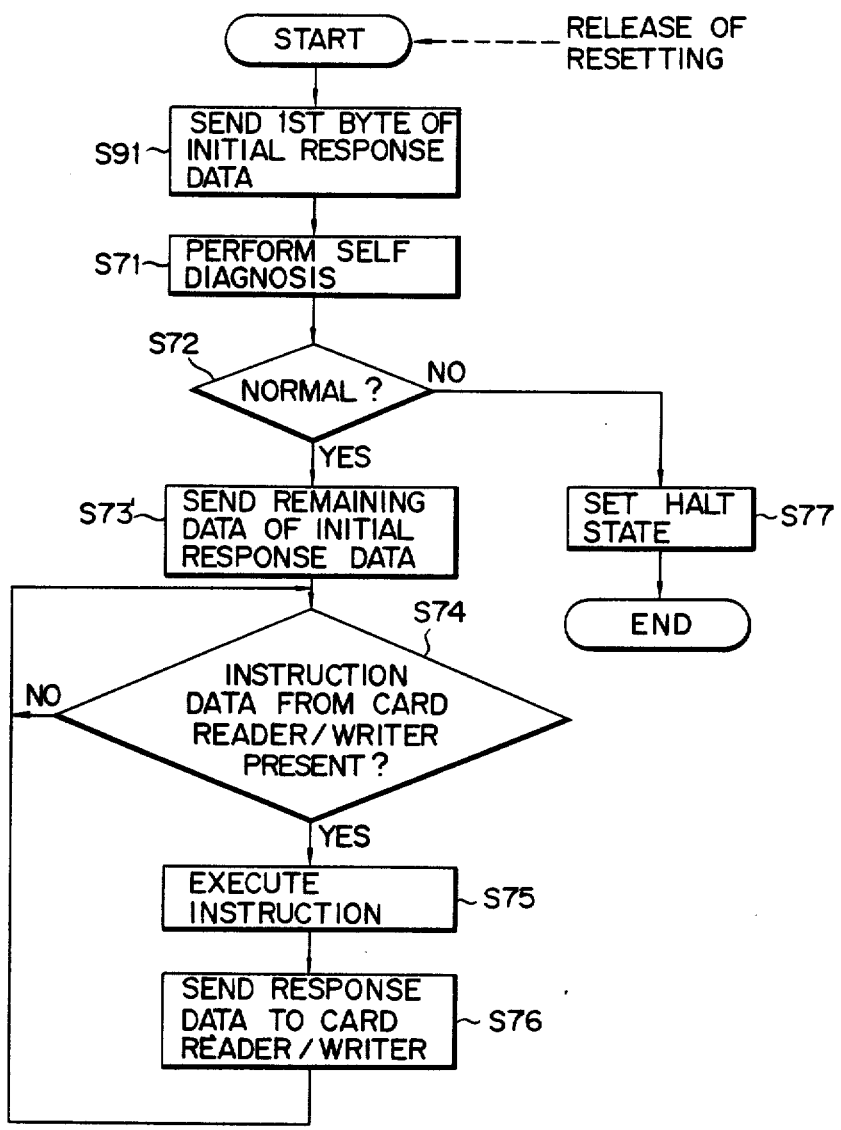
FIG. 9 is a flow chart for explaining a third embodiment of the operation of the IC card as the second electronic device in the processing system of the present invention.

According to the processing system of the present invention, as described above, the initial response data can be sent in accordance with the self diagnosis result. The initial response data send timing is being standardized according to the ISO standards. Even if the self diagnosis time is longer than the standardized send time, the initial response data must be sent at the standardized timing. An operation for allowing the above transmission will be described with reference to FIG. 9.

When control element 15 is started, control element 15 sends the first byte of the initial response data stored in program memory 17 to card reader/writer 2 within a first predetermined period of time (i.e., a period having start time of control element 15 and determined between IC card 1 and card reader/writer 2 according to the ISO standards) (step S91). According to the self diagnosis program stored in program memory 17, control element 15 determines whether the subsequent operations can be normally performed (step S71). If control element 15 determines that the normal operations can be performed (step S72), control element 15 sends all the remaining data except for the first byte of the initial response data (stored in program memory 17) to card reader/writer 2 within a second predetermined period of time (i.e, a period having the start time as the send timing of the first byte of the initial response data and determined between IC card 1 and card reader/writer 2 according to the ISO standards) (step S73'). The subsequent operations are the same as those in steps S74 to S77.

Upon initialization, IC card 1 sends only the first byte of the initial response data to card reader/writer 2 and performs the self diagnosis for determining whether normal operations can be performed. If so, the initial response data except for the first byte is sent from the IC card to card reader/writer 2. The send timing of the initial response data can be standardized. Even if the self diagnosis time is longer than the send time, the self diagnosis can be properly performed in IC card 1. When IC card 1 is held in the abnormal state, the initial response data is not sent to card reader/writer 2. Therefore, card reader/writer 2 is kept inoperative and system reliability can be improved.

When validity of the control programs stored in program memory 17 is also checked, the operations are performed according to a flow chart of FIG. 10. Control element 15 in IC card 1 executes the subprogram of the control programs upon initialization so as to check validity of the control programs. Control element 15 determines validity of the program data within range A (step 101) and determines whether the registers and the RAMs (e.g., a data send output buffer area and the like) in control element 15 used in execution of the initial response data send program are normally operated (step 102). Validity of the program data in range A is performed as follows. The program data within range A are sequentially read out and added and control element 15 determines whether the sum coincides with a value represented by check code a. If invalidity is detected (step S103), control element 15 halts.

However, if validity is detected (step 103), control element 15 sends only the first byte of the initial response data (stored in program memory 17) to card reader/writer 2 within a first predetermined period of time (i.e., a period having start time of control element 15 and determined between IC card 1 and card reader/writer 2 according to the ISO standards) (step S91). Control element 15 then checks validity of the subsequent program data within the remaining ranges (e.g., ranges B and C in FIG. 5) in the same manner as described above (step 105). Control element 15 determines whether the remaining registers and RAMs in control element 15 are normally operated (step S106). If any abnormality is detected (step S107), control element 15 halts.

Otherwise, control element 15 sends all the remaining data except for the first byte of the initial response data (stored in program memory 17) to card reader/writer 2 within a second predetermined period of time (i.e, a period having the start time as the send timing of the first byte of the initial response data and determined between IC card 1 and card reader/writer 2 according to the ISO standards) (step S73').

After all initial response data are sent to card reader/writer 2, control element 15 waits for instruction data from card reader/writer 2 (step S74). When instruction data is input from card reader/writer 2 to IC card 1, control element 15 executes the basic function represented by the input instruction data (step S75). The response data representing the processing result is output to card reader/writer 2 (step S76). Control element 15 waits for the next instruction data (step S74).

The control program and the registers which are used for data transmission are checked prior to transmission of the first byte of the initial response data. Only the first byte of the initial response data is sent to card reader/writer 2. Subsequently, the remaining control programs and registers are checked, and initial response data excluding the first byte is sent to card reader/-writer 2. Validity of the control programs stored in program memory 17 and normal/abnormal operations of IC card 1 are self-diagnosed. The send timing of the initial response data can be maintained according to the ISO standards. When IC card 1 cannot be normally operated and the program errors are present, the initial response data is not supplied to card reader/writer 2. Card reader/writer 2 is not operated and therefore system reliability can be improved.

In the above embodiments, the program data is checked by software but may be checked by hardware. As shown in FIG. 11, program data check circuit 19 is arranged in IC card 1. Program data check circuit 19 has a function for sequentially reading out program data from program memory 17, a function for determining validity of the readout program data by using a check code in the program data, and a function for enabling-/disabling control element 15.

Figure 12B:
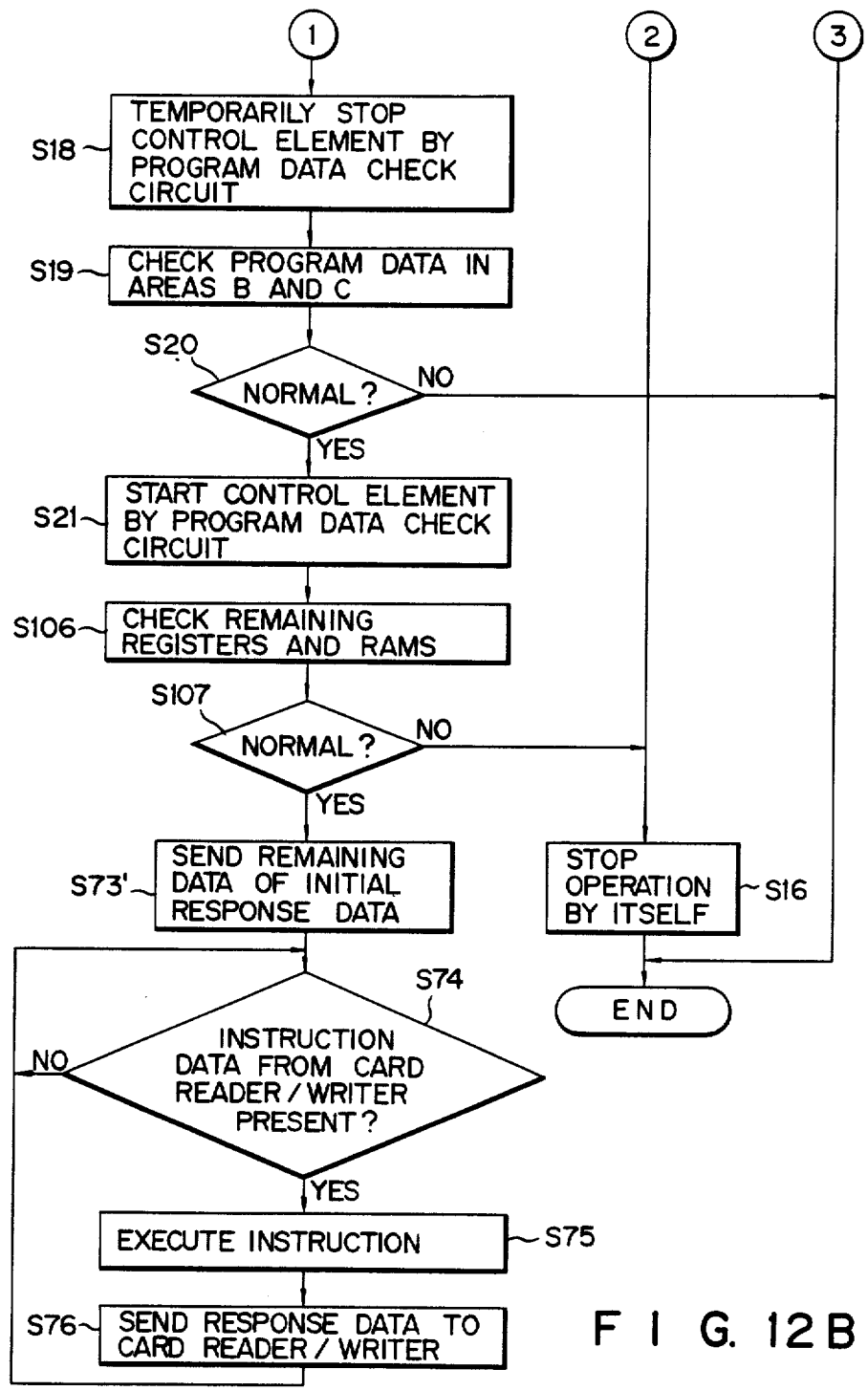

The operations of the IC card having the above arrangement will be described with reference to flow charts in FIGS. 12A and 12B. In the normal operation, a power source voltage and clocks are supplied from card reader/writer 2 to the IC card, and then the reset state of the card is canceled. When the IC card is reset at the time of reception of the power source voltage and clocks, control element 15 is not operated. The reset signal as a start control signal from card reader/writer 2 is set at a predetermined level.

When resetting is canceled, only program data check circuit 19 is operated to reset control element 15 (step S11). Program data check circuit 19 checks validity of program data in area A (step S12). For example, the program data in area A is read out and the readout data are sequentially added. Program data check circuit 19 checks whether the sum coincides with check code a. If an abnormality is detected (step S13), check circuit 19 cancels resetting of control element 15 (step S14) and control element 15 is started (step S15). Control element 15 calls the self diagnosis routine. Check circuit 19 determined whether the registers and RAMs (e.g., data output buffer area) used in the initial response data transmission routine are normally operated (step S102). If an abnormality is detected (step S103), the operation is stopped (step S16). However, if the registers and RAMs are detected to be normally operated (step S103), the initial response data transmission routine is executed and only the first byte of the initial response data in program memory 17 is sent to card reader/-writer 2 (step S91).

Control element 15 then sends a restart request to program data check circuit 19 (step S17). Check circuit 19 is started again (step S18), and the operation of control element 19 is temporarily stopped. Check circuit 19 checks the validity of program data in remaining areas B and C in the same manner as in area A (step S19). If an abnormality is detected (step S20), the current state is maintained and the operation is ended.

However, if the normal state is detected (step S20), program data check circuit 19 sends a restart request to control element 15 which has been temporarily stopped (step S21). Control element 15 is started again and the self diagnosis routine is started again. Check circuit 19 checks whether the remaining registers and RAMs in control element 15 are normally operated (step S106). If an abnormality is detected (step S107), control element 15 stops by itself (step S16). However, if the normal state is detected (step S107), control element 15 calls the initial response data transmission routine again. In this case, the remaining data except for the first byte in program memory 17 is sent to card reader/writer 2 (step S73').

After the initial response data is completely sent to card reader/writer 2, control element 15 waits for instruction data from card reader/writer. In this case, when instruction data is input from card reader/writer 2 (step S74), control element 15 performs processing according to the instruction data (step S75). The response data as the processing result is sent to card reader/writer 2 (step S76). Control element 15 waits for the next instruction data.

As described above, program data check circuit 19 is arranged to check validity of control program data in program memory 17 immediately after resetting is canceled. Enabling/disabling of control element 15 is checked on the basis of the checking result. Therefore, validity of all the control program data in program memory 17 can be accurately checked.

In the above embodiment, the first electronic device is exemplified by card reader/writer 2 and the second electronic device is exemplified by IC card 1. However, the first electronic device may be controller 3 and the second electronic device may be card reader/writer 2. In this case, programs must be stored in controller 23 in card reader/writer 2 to perform the operations as same as the above operations of IC card 1. The present invention is applicable to any system wherein the first and second electronic devices exchange data, the second electronic device is started in response to a control signal sent from the first electronic device sends back initial response data representing the start of operation to the first electronic device.

What is claimed is:

1. A processing system for enabling data communication between first and second electronic devices,
    said first electronic device including sending means for sending a control signal to a second electronic device so as to initiate operation of said second electronic device, and
    said second electronic device including:
        self-diagnosing means for self-diagnosing, prior to transmission of the initial response data to said first electronic device, whether a normal processing is performed when the control signal is received from said first electronic device;
        initial response data transmitting means for transmitting the initial response data to said first electronic device when the self diagnosis result of said self-diagnosing means indicates that the normal processing can be performed;
        inhibiting means for inhibiting the transmission of the initial response data when the self diagnosis result of said self-diagnosing means indicates that the normal processing cannot be performed; and
        processing means for receiving the instruction data from said first electronic device, performing processing of the instruction data, and sending a processing result to said first electronic device.

2. The processing system according to claim 1, wherein said second electronic device initiates operation in response to a reset signal as the control signal.

3. The processing system according to claim 1, wherein said second electronic device further comprises registering means for pre-registering the initial response data to be sent to said first electronic device.

4. The processing system according to claim 1, wherein said second electronic device comprises an IC card, and said first electronic device comprises a card handling apparatus for performing read and/or write access of said IC card.

5. The processing system according to claim 1, wherein said second electronic device includes: program memory means for storing control programs which realize said self-diagnosing means and said inhibiting means so as to self-diagnose, prior to the transmission of the initial response data to said first electronic device, whether the normal processing can be performed, and so as to inhibit the transmission of the initial response data when the self diagnosis result indicates that the normal processing cannot be performed; and control means for executing the control programs stored in said program memory means.

6. The processing system according to claim 5, wherein said second electronic device further comprises checking means for checking validity of the control programs stored in said program memory means, and said inhibiting means inhibits the transmission of the initial response data when said checking means determines that the control programs are invalid.

7. The processing system according to claim 6, wherein said checking means performs checking said control program after control means is initialized.

8. The processing system according to claim 6, wherein the control programs stored in said program memory means include program check information and a program check subprogram, and said checking means checks the validity of the control programs by referring to the program check information.

9. The processing system according to claim 1, wherein said second electronic device further includes dividing/transmitting means for dividing the initial response data into first and second parts and sending the first and second parts of the of the initial response data components to said first electronic device.

10. The processing system according to claim 9, wherein said dividing/transmitting means transmits the first part of the initial response data to said first electronic device upon starting of said second electronic device and then transmits all data, except for the first part of the response data, to said first electronic device when said self-diagnosing means determines that the normal processing can be performed.

11. The processing system according to claim 10, wherein the initial response data comprises at least two bytes, and said dividing/transmitting means transmits the first one byte of the initial response data upon initiation of said second electronic device.

12. The processing system according to claim 10, wherein said second electronic device includes: program memory means for storing control programs which realize said self-diagnosing means, said inhibiting means, and said dividing/transmitting means, so as to transmit the first part of the initial response data to said first electronic device upon starting of said second electronic device, self-diagnose whether the normal processing can be performed, inhibit the transmission of the initial response data when said self-diagnosing means determines that the normal processing cannot be performed, and send all data except for the first part to said first electronic device when said self-diagnosing means determines that the normal processing can be performed; and control means for executing the control programs stored in said program memory means.

13. The processing system according to claim 12, wherein said second electronic means further comprises checking means for checking validity of the control programs stored in said program memory means, the control programs stored in said program memory means include program check information of programs for realizing said self-diagnosing means, said inhibiting means, said dividing/transmitting means, and said checking means and a subprogram for checking the programs, and said checking means checks validity of the programs by referring to the program check information according to the subprogram.

14. The processing system according to claim 13, wherein said dividing/transmitting means transmits start data of the initial response data to said first electronic device when the programs for realizing said dividing/transmitting means and said checking means are checked and confirmed to be valid by said checking means; said checking means checks whether remaining programs are valid; and said dividing/transmitting means transmits all data, excluding the first division, to said first electronic device when said checking means determines that the remaining programs are valid and said self-diagnosing means determines that the normal processing can be performed.

15. A portable medium for exchanging data with another electronic device, comprising:
   self-diagnosing means for receiving a control signal from said another electronic device and self-diagnosing whether a normal processing can be performed;
   initial response data transmitting means for transmitting the initial response data to said another electronic device when said self-diagnosing means determines that the normal processing can be performed;
   inhibiting means for inhibiting transmission of the initial response data representing start of said portable medium when said self-diagnosing means determines that the normal processing cannot be performed; and
   processing means for receiving instruction data from said another electronic device, performing processing according to the instruction data, and sending a processing result to said another electronic device.

16. The portable medium according to claim 15, comprising:
   program memory means for storing control programs for at least said self-diagnosing means and said inhibiting means being included in said program memory means; and
   control means for executing the control programs stored in said program memory means.

17. The portable medium according to claim 16, further comprising checking means for checking validity of the control programs stored in said program memory means, and wherein said inhibiting means inhibits the transmission of the initial response data when said checking means determines that the control programs are invalid.

18. The portable medium according to claim 17, wherein the control programs stored in said program memory means include program check information and a subprogram for checking the programs, and said checking means checks validity of the control programs by referring to the program check information according to the subprogram.

19. The portable medium according to claim 15, wherein said initial response data transmitting means divides the initial response data into first and second parts and sends the first and second parts of the initial response data to said another electronic device.

20. The portable medium according to claim 19, wherein said initial response data transmitting means transmits first division of the initial response data to said another electronic device upon starting of said portable medium, and all data excluding the first part of the initial response data to said another electronic device when said self-diagnosing means determines that the normal processing can be performed.

21. The portable medium according to claim 20, wherein said initial response data transmitting means checks whether first part of the initial response data can be transmitted upon starting of said portable medium, transmits the first part to said another electronic device when it is determined that the start data can be transmitted, checks whether all data excluding the first division of the initial response data can be transmitted, and transmits the all data excluding the start data of the initial response data to said another electronic device when it is determined that the all data excluding the start data can be transmitted.

* * * * *